United States Patent
Heinitz et al.

[11] Patent Number: 6,058,708
[45] Date of Patent: May 9, 2000

[54] DEVICE FOR CONTROLLING AN INTERNAL COMBUSTION ENGINE

[75] Inventors: Dirk Heinitz, Schoenhofen; Achim Przymusinski, Regensburg, both of Germany

[73] Assignee: Siemens Aktiengesellschaft, Munich, Germany

[21] Appl. No.: 09/124,621

[22] Filed: Jul. 29, 1998

[30] Foreign Application Priority Data

Jul. 29, 1997 [DE] Germany .......................... 197 32 642

[51] Int. Cl.⁷ ................................................. F02B 37/12
[52] U.S. Cl. ............................................................ 60/602
[58] Field of Search ....................... 60/600–603; 123/564

[56] References Cited

U.S. PATENT DOCUMENTS

| | | | |
|---|---|---|---|
| 5,123,246 | 6/1992 | Younessi et al. | 60/602 |
| 5,442,918 | 8/1995 | Baeuerle et al. | 60/602 |
| 5,551,235 | 9/1996 | Entenmann et al. | 60/602 |
| 5,680,763 | 10/1997 | Unland et al. | 60/602 |
| 5,738,126 | 4/1998 | Fausten | 123/399 X |

FOREIGN PATENT DOCUMENTS

| | | |
|---|---|---|
| 44 17 647 A1 | 11/1995 | Germany . |
| 195 13 156 C1 | 5/1996 | Germany . |
| 195 05 915 A1 | 8/1996 | Germany . |
| 44 43 838 C2 | 1/1998 | Germany . |

*Primary Examiner*—Tony M. Argenbright
*Attorney, Agent, or Firm*—Herbert L. Lerner; Laurence A. Greenberg; Werner H. Stemer

[57] ABSTRACT

An internal combustion engine has a pressure sensor for a charging pressure, an air mass flow rate meter for an air mass flow and a charging device with which a bypass valve in a bypass pipe or an actuator for varying the geometry of a turbine are associated. A cascaded control device for controlling the internal combustion engine includes a first controller having a controlled variable that is the charging pressure and a manipulated variable which is the air mass flow, as well as a second controller having a controlled variable that is the air mass flow and a manipulated variable which is the degree of opening of the bypass valve.

8 Claims, 2 Drawing Sheets

DEVICE FOR CONTROLLING AN INTERNAL COMBUSTION ENGINE

BACKGROUND OF THE INVENTION

FIELD OF THE INVENTION

The invention relates to a device for controlling an internal combustion engine, having a pressure sensor in an intake tract for sensing a charging pressure, an air mass flow rate meter for sensing an air mass flow, and a charging device to which an actuator is assigned.

A device for controlling an internal combustion engine is known from German Published, Non-Prosecuted Patent Application DE 43 44 960 A1. The internal combustion engine has an intake tract with a pressure sensor which senses a charging pressure as well as an air mass flow rate meter which senses an air mass flow. A charging device has a compressor, a turbine and a bypass valve in a bypass pipe which bypasses the turbine. A controller is provided having a controlled variable which is the charging pressure and a manipulated variable that is a signal for actuating the bypass valve. However, the charging pressure changes only after a long delay time after the bypass valve has been influenced. Accordingly, the controller has a low control quality, particularly during the non-steady state operation of the internal combustion engine.

SUMMARY OF THE INVENTION

It is accordingly an object of the invention to provide a device for controlling an internal combustion engine, which overcomes the hereinafore-mentioned disadvantages of the heretofore-known devices of this general type and which quickly and precisely adjusts a charging pressure even during non-steady state operation of the internal combustion engine.

With the foregoing and other objects in view there is provided, in accordance with the invention, a device for controlling an internal combustion engine including an intake tract, a pressure sensor in the intake tract for sensing a charging pressure, an air mass flow rate meter for sensing an air mass flow, a charging device, and an actuator associated with the charging device, comprising a cascaded control device including a first controller using the charging pressure as a controlled variable and the air mass flow as a manipulated variable, and a second controller using the air mass flow as a controlled variable and having a manipulated variable acting on the actuator.

The second controller quickly smoothes out deviations in the air mass flow so that the control errors of the first controller are reduced.

In accordance with another feature of the invention, the manipulated variable of the second controller is an exhaust gas pressure, and the cascaded control device includes a third controller using the exhaust gas pressure as a controlled variable and having a manipulated variable acting on the actuator.

In accordance with a further feature of the invention, the first controller is a proportional-integral controller.

In accordance with an added feature of the invention, the second controller is a proportional controller.

In accordance with an additional feature of the invention, the cascaded control device determines a setpoint value of the charging pressure as a function of a pedal position of an accelerator pedal and a rotational speed.

In accordance with yet another feature of the invention, the cascaded control device additionally determines the charging pressure as a function of a charging air temperature.

In accordance with yet a further feature of the invention, the charging device has a turbine, and the actuator is an actuator for varying a geometry of the turbine.

In accordance with a concomitant feature of the invention, the actuator is a bypass valve in a bypass pipe.

Other features which are considered as characteristic for the invention are set forth in the appended claims.

Although the invention is illustrated and described herein as embodied in a device for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
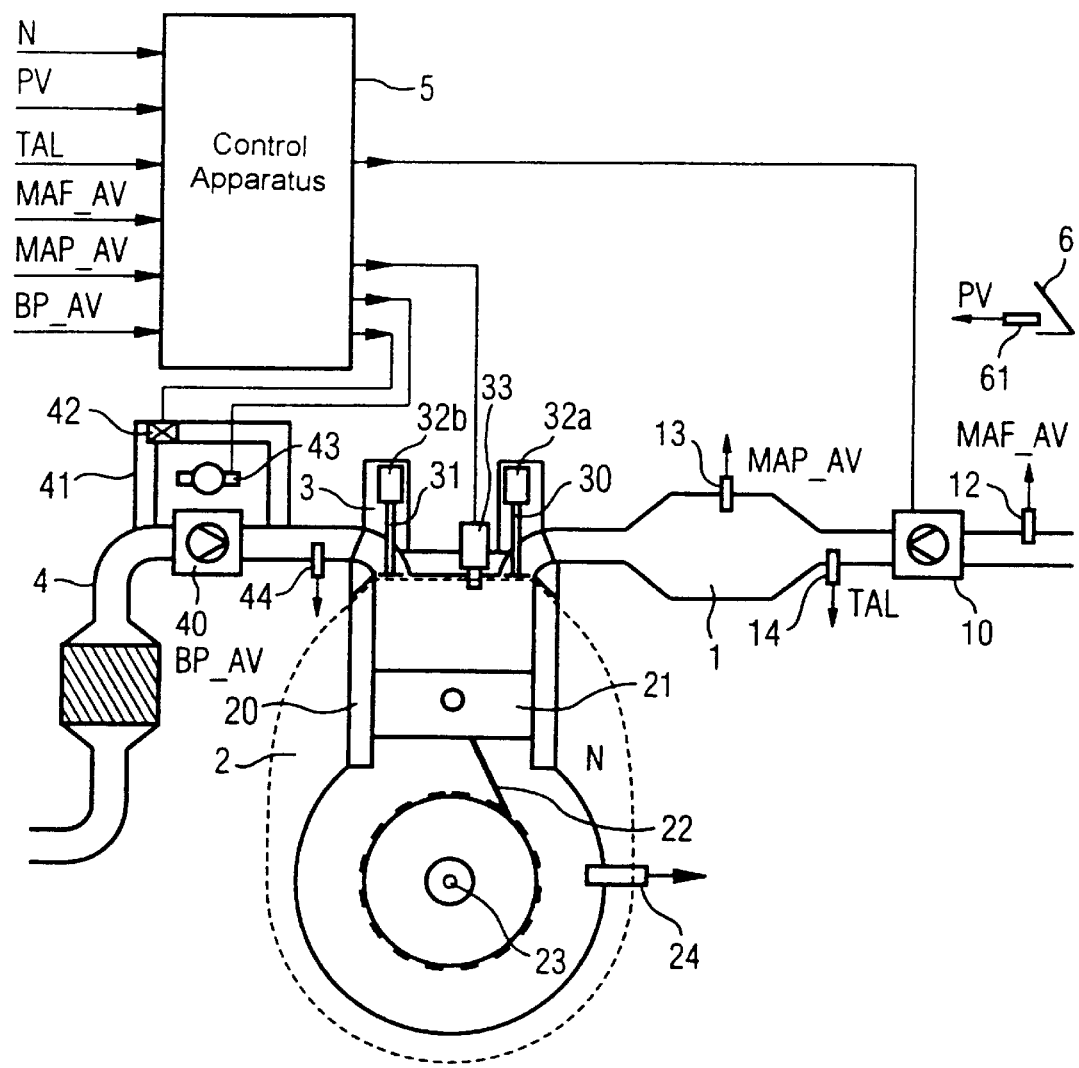
FIG. 1 is a diagrammatic and schematic illustration of an internal combustion engine with a control device.

Referring now to the figures of the drawings in detail and first, particularly, to FIG. 1 thereof, there is seen an internal combustion engine which includes an intake tract 1 with a compressor 10 and an engine block 2 with a cylinder 20 and a crankshaft 23. A piston 21 and a connecting rod 22 are associated with the cylinder 20. The connecting rod 22 is connected to the piston 21 and the crankshaft 23.

Furthermore, a valve drive having at least one inlet valve 30 and one outlet valve 31, is disposed in a cylinder head 3. In addition, an injection valve 33, which is disposed in such a way that fuel is metered directly into the interior of the cylinder 20, is provided in the cylinder head 3. The metered fuel is preferably Diesel oil, but as an alternative gasoline may also be metered. If gasoline is used as the fuel, a sparkplug is additionally disposed in the cylinder head 3. The internal combustion engine is illustrated with one cylinder in FIG. 1. However, it may also have a plurality of cylinders.

Furthermore, the internal combustion engine includes an exhaust gas tract 4 with a turbine 40 which is mechanically coupled to the compressor 10. A bypass pipe 41 is connected to the exhaust gas tract 4, upstream and downstream of the turbine 40. A bypass valve 42 is disposed in the bypass pipe 41. Instead of the bypass pipe with the bypass valve 42, an adjustment drive 43 may be provided, through the use of which the geometry of the turbine 40 can be adjusted. In this context, blade wheels of the turbine 40 are adjusted, for example. As an alternative, the compressor 10 may also be mechanically coupled to the crankshaft 23. Then a bypass line to the compressor 10 is provided instead of the turbine 40 and the bypass pipe 41 or the adjustment drive 43. The bypass valve 42 is disposed in the bypass line.

A control apparatus 5 is provided for the internal combustion engine. Sensors which sense various measured variables and which respectively determine a measured value of the measured variable are associated with the apparatus 5. The control apparatus 5 determines one or more actuation signals which respectively control an actuation device, as a function of at least one measured variable.

The sensors are a pedal position sensor 61 which senses a pedal position PV of an accelerator pedal 6, an air mass flow rate meter 12 which senses an air mass flow, a pressure sensor 13 which senses a charging pressure, a temperature sensor 14 which senses a charging air temperature TAL, a rotational speed sensor 24 which senses a rotational speed N of the crankshaft 23, and a further pressure sensor 44 which senses an exhaust gas pressure in the exhaust gas tract 4. Any desired subset of the aforesaid sensors, or even additional sensors may be provided, depending on the embodiment of the invention.

Operational variables include the measured variables and variables derived therefrom, such as an exhaust gas temperature, which are determined through the use of a characteristic diagram relationship or by an observer.

The actuation devices each include an actuating drive and an actuator. The actuating drive is an electromotive drive, an electromagnetic drive, a mechanical drive or a further drive known to a person skilled in the art. The actuators are provided as the injection valve 33, as the bypass valve 42 or as the adjustment drive 43 for adjusting the geometry of the turbine.

The control apparatus 5 is preferably constructed as an electronic engine controller. However, it may also include a plurality of control apparatuses which are electrically conductively connected to one another, for example through a bus system.

Figure 2:
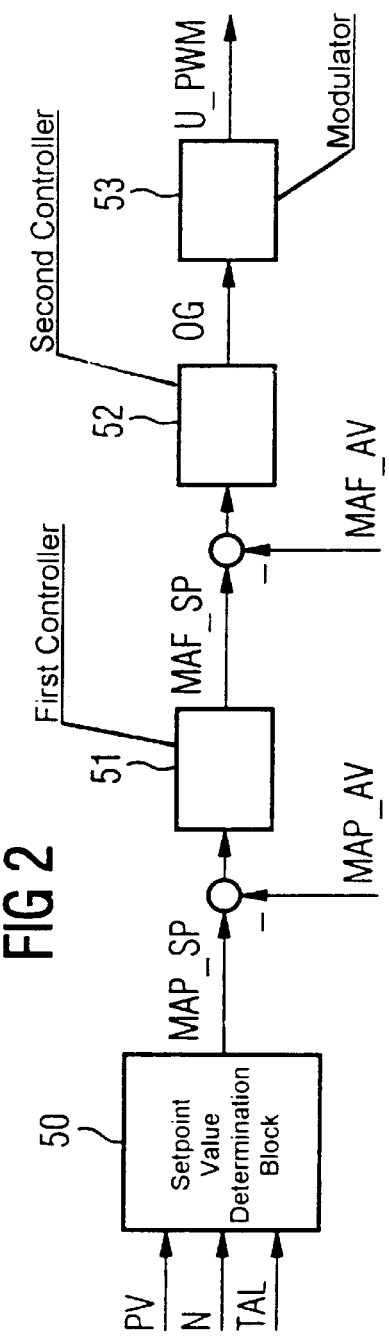
FIG. 2 is a block circuit diagram of a first embodiment of the cascaded control device.

FIG. 2 illustrates a block circuit diagram of a cascaded control device which is disposed in the control apparatus 5. A setpoint value MAP_SP of the charging pressure is determined in a block 50 as a function of the pedal value PV, of the rotational speed N and of the charging air temperature TAL. For this purpose, a characteristic diagram in which values of the setpoint values MAP_SP are stored as a function of the pedal value and/or of the rotational speed N and/or of the charging air temperature TAL, is preferably provided.

A first controller 51 has the charging pressure as a controlled variable. The first controller 51 determines a setpoint value MAF_SP of the air mass flow as a function of a difference between the setpoint value MAP_SP and the actual value MAP_AV of the charging pressure. The first controller 51 is preferably constructed as a PI controller and is thus both quick and precise in steady state.

A second controller 52 is provided having a controlled variable which is the air mass flow. The second controller 52 determines a degree of opening of the bypass valve, or in another embodiment an adjustment angle of the blades of the turbine 40, as a function of a difference between the setpoint value MAF_SP and the actual value MAF_AV of the air mass flow. The second controller 52 is preferably constructed as a P or PD controller.

A modulator 53 is provided which pulse-width modulates a voltage signal U_PWM as a function of a degree of opening OG.

In a non-steady operating state, the actual value MAF_AV of the air mass flow firstly changes more quickly than the actual value MAP_AV of the charging pressure. The second controller 52 can thus smooth out a control error at an early stage so that the first controller only has to smooth out a relatively small control error.

Figure 3:
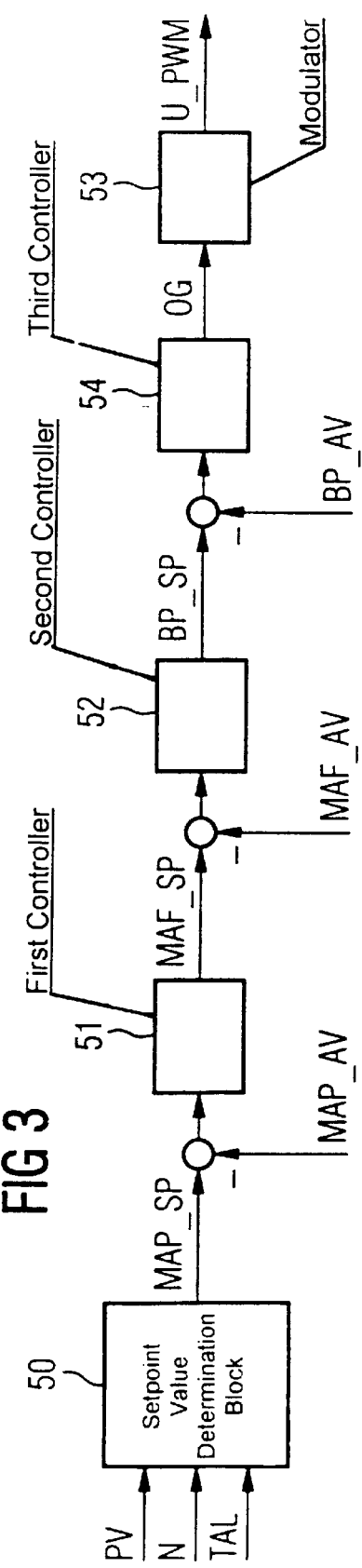
FIG. 3 is a block circuit diagram of a second embodiment of the cascaded control device.

In a further exemplary embodiment shown in FIG. 3, the second controller 52 determines a setpoint value BP_SP of the exhaust gas pressure. A controlled variable of a third controller 54 is the exhaust gas pressure. The third controller 54 determines the degree of opening OG of the bypass valve or an adjustment angle of the blades of the turbine 40 as a function of a difference between the setpoint value BP_SP and an actual value BP_AV of the exhaust gas pressure. The third controller is preferably constructed as a P or PD controller. The cascaded control device according to FIG. 3 ensures a particularly high control quality since the exhaust gas pressure directly influences the power of the turbine 40. Characteristic diagrams are determined through the use of steady-state measurements on an engine test bed or through the use of driving trials.

The invention is not restricted to the exemplary embodiments described herein. For example, the cascaded control device can also include further controllers. As an alternative, the parameters of the controllers 51, 52, 54 may also be dependent on the rotational speed N. If the internal combustion engine has a charging device with a compressor that is mechanically connected to the crankshaft 23, the controlled variable quality of the second or third controller 52, 54 is preferably the rotational speed N.

We claim:

1. In an internal combustion engine having an intake tract, a pressure sensor in the intake tract for sensing a charging pressure, an air mass flow rate meter for sensing an air mass flow, a charging device, and an actuator associated with the charging device, a device for controlling the internal combustion engine, comprising:

a cascaded control device including a first controller using the charging pressure as a controlled variable and the air mass flow as a manipulated variable, and a second controller using the air mass flow as a controlled variable and having a manipulated variable acting on the actuator.

2. The device according to claim 1, wherein the manipulated variable of said second controller is an exhaust gas pressure, and said cascaded control device includes a third controller using the exhaust gas pressure as a controlled variable and having a manipulated variable acting on the actuator.

3. The device according to claim 1, wherein said first controller is a proportional-integral controller.

4. The device according to claim 1, wherein said second controller is a proportional controller.

5. The device according to claim 1, wherein said cascaded control device determines a setpoint value of the charging pressure as a function of a pedal position of an accelerator pedal and a rotational speed.

6. The device according to claim 5, wherein said cascaded control device additionally determines the charging pressure as a function of a charging air temperature.

7. The device according to claim 1, wherein the charging device has a turbine, and the actuator is an actuator for varying a geometry of the turbine.

8. The device according to claim 1, wherein the actuator is a bypass valve in a bypass pipe.

* * * * *